United States Patent
Konuma

(10) Patent No.: US 10,175,522 B2
(45) Date of Patent: Jan. 8, 2019

(54) OPTICAL DEFLECTION DIFFUSION SHEET, LAMINATED OPTICAL DEFLECTION DIFFUSION SHEET, LAMINATED OPTICAL SHEET, AND LIQUID CRYSTAL DISPLAY DEVICE USING SAME

(71) Applicant: SAMSUNG ELECTRONICS CO., LTD., Suwon-si (KR)

(72) Inventor: Osamu Konuma, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/534,791

(22) PCT Filed: Dec. 9, 2015

(86) PCT No.: PCT/KR2015/013466
§ 371 (c)(1),
(2) Date: Jun. 9, 2017

(87) PCT Pub. No.: WO2016/093625
PCT Pub. Date: Jun. 16, 2016

(65) Prior Publication Data
US 2017/0329160 A1    Nov. 16, 2017

(30) Foreign Application Priority Data

Dec. 10, 2014  (JP) .................... 2014-249629
Oct. 30, 2015  (JP) .................... 2015-214513

(51) Int. Cl.
*G02F 1/1335*  (2006.01)
*B32B 27/30*   (2006.01)
(Continued)

(52) U.S. Cl.
CPC .......... *G02F 1/1335* (2013.01); *B32B 27/308* (2013.01); *B32B 37/142* (2013.01);
(Continued)

(58) Field of Classification Search
CPC .............. G02F 2001/133607; G02F 1/133504
See application file for complete search history.

(56) References Cited

U.S. PATENT DOCUMENTS 7,736,045 B2    6/2010   Yamashita et al.
2006/0038935 A1  2/2006   Kim
(Continued)

FOREIGN PATENT DOCUMENTS

JP   2001-174633 A   6/2001
JP   2003-172931 A   6/2003
(Continued)

OTHER PUBLICATIONS

International Search Report dated Mar. 21, 2016, issued by International Searching Authority in International Application No. PCT/KR2015/013466 (PCT/ISA/210).
(Continued)

*Primary Examiner* — Kendrick Hsu
(74) *Attorney, Agent, or Firm* — Sughrue Mion, PLLC

(57) ABSTRACT

A light deflection diffusion sheet, a stacked light deflection diffusion sheet, and a stacked optical sheet that are used in a liquid crystal panel are disclosed. A liquid crystal display (LCD) device include a liquid crystal panel having a length direction and a width direction; a surface light emitting module; a base sheet disposed between the liquid crystal panel and the surface light emitting module; a light diffusion layer disposed on a surface of the base sheet facing the surface light emitting module and diffusing light incident from the surface light emitting module; and a light deflection layer disposed on a surface of the base sheet facing the liquid crystal panel and controlling a travel direction of the light.

19 Claims, 9 Drawing Sheets

(51) Int. Cl.
    *B32B 37/14*     (2006.01)
    *G02B 5/02*     (2006.01)
    *B32B 37/12*     (2006.01)

(52) U.S. Cl.
    CPC ......... *G02B 5/0242* (2013.01); *G02B 5/0278* (2013.01); *G02B 5/0284* (2013.01); *G02F 1/133615* (2013.01); *B32B 37/12* (2013.01); *B32B 2457/202* (2013.01); *G02F 2001/133607* (2013.01)

(56) References Cited

U.S. PATENT DOCUMENTS

| | | | | |
|---|---|---|---|---|
| 2010/0245717 | A1* | 9/2010 | Miyamoto | G02B 6/0051 349/65 |
| 2011/0024928 | A1* | 2/2011 | Laney | G02B 5/0242 264/1.31 |
| 2015/0226999 | A1 | 8/2015 | Fuchida et al. | |
| 2015/0301264 | A1* | 10/2015 | Min | G02B 5/0231 362/343 |

FOREIGN PATENT DOCUMENTS

| | | |
|---|---|---|
| JP | 2006-58877 A | 3/2006 |
| JP | 2009-53623 A | 3/2009 |
| JP | 2013-226265 A | 11/2013 |
| JP | 2014-82095 A | 5/2014 |
| JP | 2014-224963 A | 12/2014 |
| KR | 10-0863865 B1 | 10/2008 |
| KR | 10-2009-0130430 A | 12/2009 |
| KR | 10-2012-0071077 A | 7/2012 |
| KR | 10-2012-0085755 A | 8/2012 |
| KR | 10-1280187 B1 | 6/2013 |
| KR | 10-2014-0066919 A | 6/2014 |

OTHER PUBLICATIONS

Written Opinion dated Mar. 21, 2016, issued by International Searching Authority in International Application No. PCT/KR2015/013466 (PCT/ISA/237).

* cited by examiner

OPTICAL DEFLECTION DIFFUSION SHEET, LAMINATED OPTICAL DEFLECTION DIFFUSION SHEET, LAMINATED OPTICAL SHEET, AND LIQUID CRYSTAL DISPLAY DEVICE USING SAME

TECHNICAL FIELD

The present disclosure relates to an optical sheet disposed between a liquid crystal panel and a surface light emitting module in a liquid crystal display (LCD) device.

The present disclosure also relates to an LCD device using an optical sheet.

BACKGROUND ART

As flat panel display devices used in notebook computers, televisions (TVs), or portable phones that require thinning, miniaturization, and low power consumption, a plasma display panel (PDP), a field emission display device (FED), a thin film transistor liquid crystal display (TFT-LCD) device, etc, have been recently developed. Among these, active research into a liquid crystal display (LCD) device having excellent color reproduction and thinness has been conducted.

Among flat panel display devices, although a PDP and an FED may enable self emission, since the LCD does not enable self emission, the LCD may radiate light by using an auxiliary backlight unit that is an auxiliary light source in order to achieve an image display. The backlight unit has a structure of a surface light source, which is referred to as an edge type or a direct type, in order to meet a requirement that light be uniformly irradiated to an entire screen.

DETAILED DESCRIPTION OF THE INVENTION

Technical Problem

The present disclosure relates to an optical sheet that reduces an optical loss of a liquid crystal display (LCD) device and enables the LCD to have an enhanced brightness and viewing angle and the LCD using the optical sheet.

Technical Solution

According to an embodiment, a liquid crystal display (LCD) device includes a liquid crystal panel having a length direction and a width direction; a surface light emitting module; a base sheet disposed between the liquid crystal panel and the surface light emitting module; a light diffusion layer disposed on a surface of the base sheet facing the surface light emitting module and diffusing light incident from the surface light emitting module; and a light deflection layer disposed on a surface of the base sheet facing the liquid crystal panel and controlling a travel direction of the light.

Advantageous Effects of the Invention

An optical sheet according to an embodiment of the present disclosure includes a light diffusion layer and a light deflection layer, thereby reducing an optical loss of a liquid crystal display (LCD) device.

Also, the optical sheet according to an embodiment of the present disclosure includes a prism pattern and a reflection polarization sheet, thereby enhancing a brightness and viewing angle of the LCD.

BEST MODE

Figure 1:
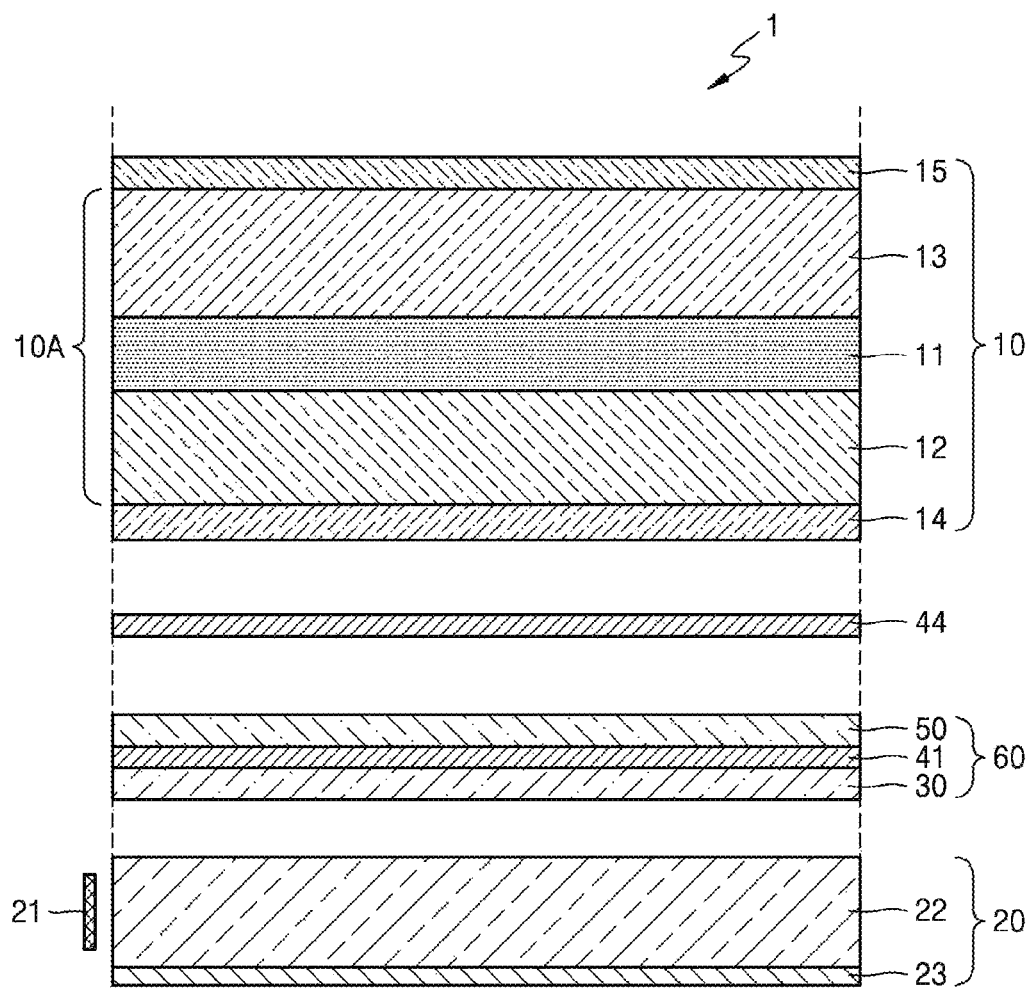
FIG. 1 is an exploded cross-sectional view of a liquid crystal display (LCD) device according to an embodiment.

An embodiment of the present disclosure includes a liquid crystal display (LCD) device including a liquid crystal panel having a length direction and a width direction; a surface light emitting module; a base sheet disposed between the liquid crystal panel and the surface light emitting module; a light diffusion layer disposed on a surface of the base sheet facing the surface light emitting module and diffusing light incident from the surface light emitting module; and a light deflection layer disposed on a surface of the base sheet facing the liquid crystal panel and controlling a travel direction of the light.

The surface light emitting module may include at least one of an edge type surface light emitting module or a direct type surface light emitting module.

The light deflection layer may include a prism pattern having a ridge in parallel to the length direction of the liquid crystal panel.

The light diffusion layer may include a rough surface that diffuses and scatters the light.

The light diffusion layer may include a plurality of light scatter beads that diffuse and scatter the light.

The LCD device may further include: a reflection deflection sheet disposed on the light deflection layer and reflecting one deflected light of the light to the surface light emitting module.

The LCD device may further include: a bonding layer configured to combine the light deflection layer and the reflection deflection sheet.

The bonding layer may include: an adhesion layer bonded to the light deflection layer; and a light diffusion layer combined with the reflection deflection sheet and including a plurality of light scatter beads.

An embodiment of the present disclosure includes liquid crystal display (LCD) device including: a liquid crystal panel having a length direction and a width direction; a surface light emitting module; a first base sheet disposed between the liquid crystal panel and the surface light emitting module; a light diffusion layer disposed on a surface of the first base sheet facing the surface light emitting module and diffusing light incident from the surface light emitting module; a first light deflection layer disposed on a surface of the first base sheet facing the liquid crystal panel and controlling a travel direction of the light; a second base sheet disposed between the liquid crystal panel and the first light deflection layer; and a second light deflection layer disposed on a surface of the second base sheet facing the liquid crystal panel.

The surface light emitting module may include at least one of an edge type surface light emitting module or a direct type surface light emitting module.

The first light deflection layer may include a first prism pattern having a ridge in parallel to the width direction of the liquid crystal panel, and the second light deflection layer includes a second prism pattern having a ridge in parallel to the length direction of the liquid crystal panel.

The light diffusion layer may include a rough surface that diffuses and scatters the light.

The light diffusion layer may include a plurality of light scatter beads that diffuse and scatter the light.

The LCD device may further include: a reflection deflection sheet disposed on the second light deflection layer and reflecting one deflected light of the light to the surface light emitting module.

The LCD device may further include: a bonding layer configured to combine the second light deflection layer and the reflection deflection sheet.

The bonding layer may include: an adhesion layer bonded to the light deflection layer; and a light diffusion type bonding portion combined with the reflection deflection sheet and including a plurality of light scatter beads.

An embodiment of the present disclosure includes light deflection diffusion sheet disposed between a light crystal panel having a length direction and a width direction and a surface light emitting module, the light deflection diffusion sheet including: a base sheet; a light diffusion layer disposed on a surface of the base sheet facing the surface light emitting module and diffusing light incident from the surface light emitting module; and a light deflection layer disposed on a surface of the base sheet facing the liquid crystal panel of the base sheet and controlling a travel direction of the light.

The light deflection diffusion sheet may further include: a reflection deflection sheet disposed between the liquid crystal panel and the light deflection layer and reflecting one deflected light of the light to the surface light emitting module.

An embodiment of the present disclosure includes a stacked light deflection diffusion sheet disposed between a light crystal panel having a length direction and a width direction and a surface light emitting module, the stacked light deflection diffusion sheet including: a first base sheet; a light diffusion layer disposed on a surface of the first base sheet facing the surface light emitting module and diffusing light incident from the surface light emitting module; a first light deflection layer disposed on a surface of the first base sheet facing the liquid crystal panel and controlling a travel direction of the light; a second base sheet disposed between the liquid crystal panel and the first light deflection layer; and a second light deflection layer disposed on a surface of the second base sheet facing the liquid crystal panel, wherein the first light deflection layer includes a first prism pattern having a ridge in parallel to the width direction of the liquid crystal panel, and wherein the second light deflection layer includes a second prism pattern having a ridge in parallel to the length direction of the liquid crystal panel.

The stacked light deflection diffusion sheet may further include: a reflection deflection sheet disposed between the liquid crystal panel and the second light deflection layer and reflecting one deflected light of the light to the surface light emitting module.

MODE OF THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects thereof. In the drawings, portions irrelevant to the description are omitted for convenience of explanation. Like numerals refer to like elements throughout the description of the figures.

Throughout the specification, it will be understood that when a unit is referred to as being "connected" to another element, it may be "directly connected" to the other element or "electrically connected" to the other element in a state in which intervening elements are present. In addition, it will be understood that when a unit is referred to as "comprising" another element, it does not preclude the possibility that one or more other elements may exist or may be added.

FIG. 1 is an exploded cross-sectional view of a liquid crystal display (LCD) device 1 according to an embodiment.

Referring to FIG. 1, the LCD device 1 includes a liquid crystal panel 10, a surface light emitting module 20 functioning as a backlight, and a stacked optical sheet 60.

The liquid crystal panel 10 includes a liquid crystal cell 10A and absorption polarization sheets 14 and 15 disposed on upper and lower outer surfaces of the liquid crystal cell 10A.

The liquid crystal cell 10A includes a pair of transparent substrates 12 and 13 arranged to face each other with a predetermined distance therebetween and a liquid crystal layer 11 formed by sealing liquid crystal between the pair of transparent substrates 12 and 13. A transparent electrode (not shown) or an orientation layer (not shown) may be formed in each of the pair of transparent substrates 12 and 13. Voltages may be applied between the transparent electrodes based on display data, and thus the liquid crystal of the liquid crystal layer 11 may be oriented.

Absorption deflection light sheets 14 and 15 that absorb one of an S deflection light and a P deflection light and selectively transmit another deflection light may be disposed on the upper and lower outer surfaces of the liquid crystal cell 10A.

Also, a phase difference sheet (not shown) may be formed between the liquid crystal cell 10A and the absorption deflection light sheets 14 and 15.

The surface light emitting module 20 may include a light source 21, a light guide plate 22 guiding light emitted from the light source 21, and a light reflection sheet 23 arranged on a lower portion of the light guide plate 22.

The light source 21 may generate light and may use various light sources such as a liner light source lamp, a surface light source lamp, a CCFL, or an LED, etc.

The light guide plate 22 may guide the light generated from the light source 21 to an inner portion thereof so that light may arrive at a front surface of the light reflection sheet 23. The light guide plate 22 may be omitted when a direct type light source is adopted.

The light reflection sheet 23 may reflect light emitted from the light source 21 and guided by the light source plate 22, thereby emitting the light outside the light guide plate 22.

The stacked optical sheet 60 may be arranged between the liquid crystal panel 10 and the surface light emitting module 20. The stacked optical sheet 60 may include a light deflection diffusion sheet 30, a reflection deflection sheet 50 arranged on the light deflection diffusion sheet 30, and a bonding layer 41 combining the light deflection diffusion sheet 30 and the reflection deflection sheet 50.

The light deflection diffusion sheet 30 may be an optical sheet having a light deflection function and a light diffusion function.

The reflection deflection sheet 50 may selectively reflect a deflection light absorbed by the absorption deflection sheet 14 disposed on the lower portion of the liquid crystal panel 10. That is, the reflection deflection sheet 50 may reflect the deflection light to be absorbed by the absorption deflection sheet 14 to the surface light emitting module 20 in advance. The light reflected to the surface light emitting module 20 by the reflection deflection sheet 50 may be repeatedly totally reflected within the light guide plate 22 again. During total reflection, the light may be partially converted into a deflection light that is transmitted through the absorption deflection sheet 14. Thus, an amount of the deflection light absorbed by the absorption deflection sheet 14 may be reduced, and thus brightness of the LCD device 1 may be enhanced. The reflection deflection sheet 50 may be omitted.

The light deflection diffusion sheet 30 and the reflection deflection sheet 50 may be combined through the bonding layer 41 including a glue or an adhesive, etc. and integrated into the stacked optical sheet 60. The integrated stacked optical sheet 60 may inhibit a sheet from being bent and may enhance handling of the sheet, thereby facilitating assembling of the LCD device 1.

Also, the stacked optical sheet 60 and the liquid crystal panel 10 may be combined through a bonding layer 44.

Figure 2:
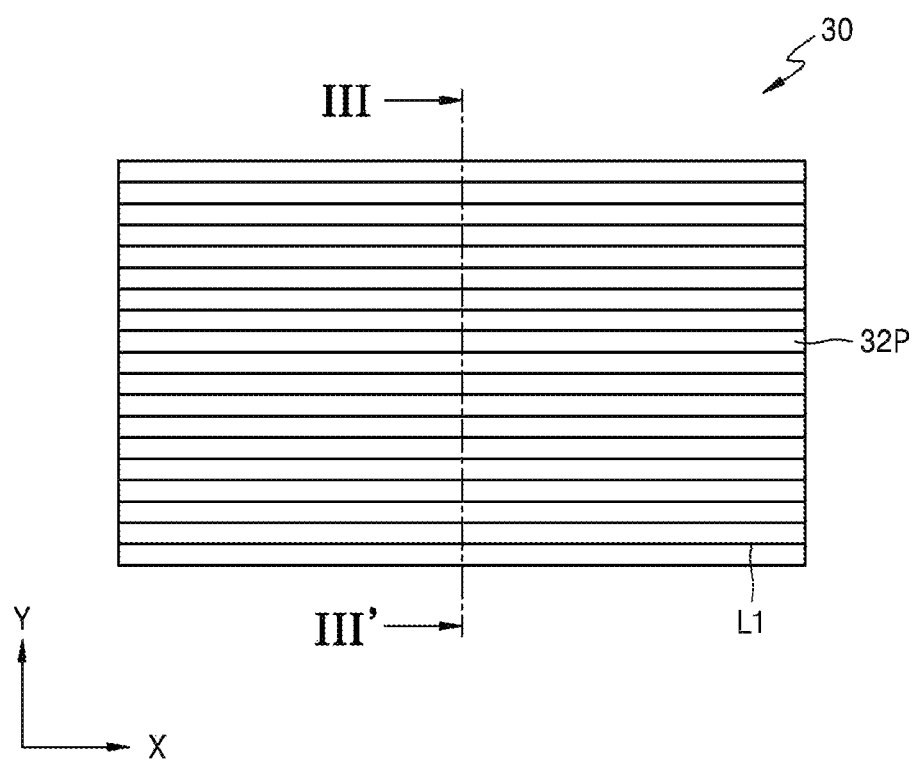
FIG. 2 is a plan view of a light deflection diffusion sheet of an LCD device according to an embodiment.

FIG. 2 is a plan view of a light deflection diffusion sheet 30 of the LCD device 1 according to an embodiment.

Referring to FIG. 2, the light deflection diffusion sheet 30 may include a prism pattern 32P controlling a travel direction of an emission light to a surface of the liquid crystal panel 10 of the light deflection diffusion sheet 30. The prism pattern 32P may have a ridge L1 in parallel to a length direction of the LCD device 1.

In general, the LCD device 1 like a liquid crystal TV has a characteristic that a viewing angle of a horizontal direction is more important than a viewing angle of a vertical direction. The ridge L1 of the prism pattern 32P may be formed as the length direction of the LCD device 1, and thus the viewing angle of the horizontal direction may be effectively increased. Also, a ridge direction of the prism pattern 32) may be changed according to a use of the LCD device 1, etc.

Figure 3A:
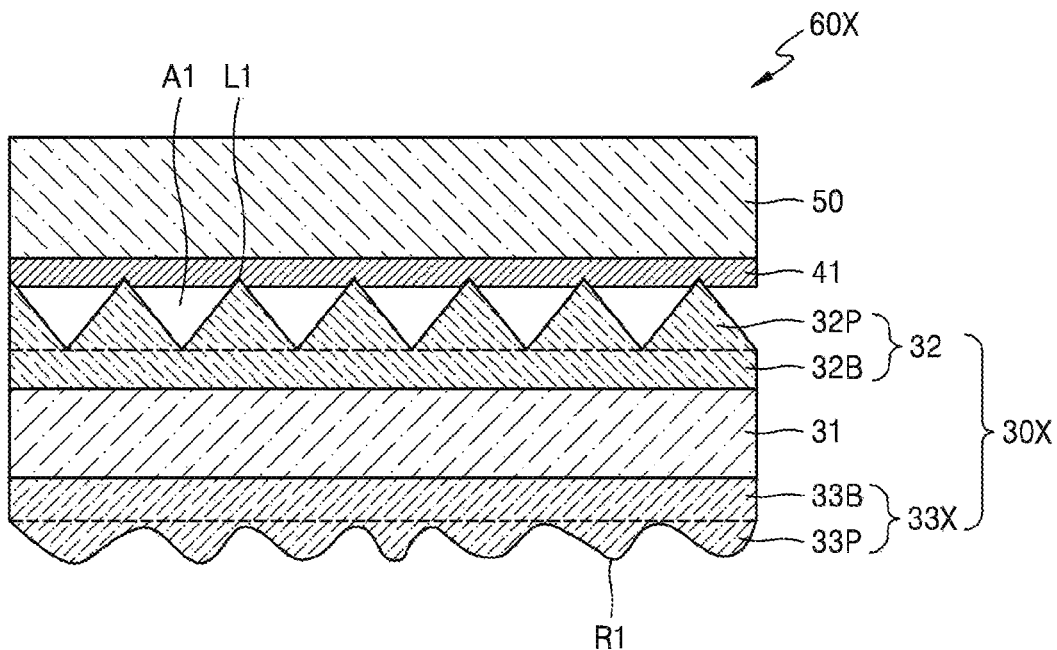
FIG. 3A is a cross-sectional view of a stacked optical sheet including a light deflection diffusion sheet (a cross-sectional view of III-III' of FIG. 2) according to an embodiment, in an LCD device according to an embodiment.

FIG. 3A is a cross-sectional view of a stacked optical sheet 60X including a light deflection diffusion sheet 30X (a cross-sectional view of III-III' of FIG. 2) according to an embodiment, in the LCD device 1 according to an embodiment. The stacked optical sheet 60X is an embodiment of the stacked optical sheet 60 of FIG. 1. The stacked optical sheet 60X may be arranged between the liquid crystal panel 10 and the surface light emitting module 20 of FIG. 1.

Referring to FIG. 3A, the light deflection diffusion sheet 30X may include a base sheet 31, a light diffusion layer 33X disposed on a lower surface of the base sheet 31, and a light deflection sheet 32 disposed on an upper surface of the base sheet 31.

The base sheet 31 may include a material such as PET (polyethyleneterephthalate) or polyester and may transmit incident light. The base sheet 31 may have a thickness from about 50 μm to about 300 μm but is not limited thereto.

The light diffusion layer 33X may be disposed on a lower surface of the base sheet 31, i.e. a surface of the surface light emitting module 20 of the base sheet 31. The light diffusion layer 33X may include a flat base portion 33B and a light diffusion portion 33P formed below the base portion 33B and having a rough surface R1 that functions to diffuse light.

The light diffusion portion 33P may have a thickness from about 20 μm to about 50 μm but is not limited thereto.

The base portion 33B may have a thickness from about 5 μm to about 10 μm but is not limited thereto.

Light emitted from the light source 21 of the surface light emitting module 20 and then passing through the light guide plate 22 and incident into the light diffusion layer 33X may be diffused and scattered by the rough surface R1 of the light diffusion layer 33X. The light diffusion layer 33X may diffuse and scatter the light and supply the light to the light deflection layer 32.

The light deflection layer 32 may be disposed on an upper surface of the base sheet 31, i.e. a surface of the liquid crystal panel 10 of the base sheet 31. The light deflection layer 32 may include a flat base portion 32B and a prism pattern 32P formed above the base portion 32B and controlling a travel direction of the light.

The prism pattern 32P may have a thickness from about 20 μm to about 50 μm but is not limited thereto. Also, an apex angle of the prism pattern 32P may have a range of 90° and ±5° but is not limited thereto.

The base portion 32B may have a thickness from about 5 μm to about 10 μm but is not limited thereto.

The light deflection layer 32 may diffract the light incident through the light diffusion layer 33X and focus the light to a planar surface of the liquid crystal panel 10.

The light diffusion layer 33X and the light deflection layer 32 may include transmittance resin such as acrylic resin, etc.

The bonding layer 41 connecting the ridges L1 may be formed on the plurality of prism patterns 32P of the light deflection layer 32. Between the two adjacent prism patterns 32P, an air portion A1 surrounded by the two adjacent prism patterns 32P and the bonding layer 41 may be formed. The bonding layer 41 may not be formed in the air portion A1. Accordingly, light emitted from each surface of the prism pattern 32P may not be diffracted by the bonding layer 41 and a travel direction of the light may be controlled.

Also, the bonding layer 41 may combine and integrate the light deflection diffusion sheet 30X and the reflection deflection sheet 50 into the integrated stacked optical sheet 60X.

In the use of a liquid crystal TV, etc., brightness of the LCD device 1 may be more than 2900 cd/m$^2$ and preferably more than 3000 cd/m$^2$.

In the use of the liquid crystal TV, etc., both a horizontal viewing angle and a vertical viewing angle of the LCD device 1 may be more than 52° and preferably more than 55°.

The horizontal viewing angle and the vertical viewing angle may be angles having a center brightness of ½.

To suit the brightness and the viewing angle of the LCD device 1, a haze value of the light diffusion portion 33P of the light diffusion layer 33X may range from about 5% to about 70%, preferably from about 5% to about 30%, and in particular from about 5% to about 20%.

The light deflection diffusion sheet 30X may be manufactured through the following process:

Firstly, the base sheet 31 may be prepared, and an upper surface of the base sheet 31, i.e. a surface of the liquid crystal panel 10, may be coated with a resin paste including curable resin and a solvent, and thus a first non-cured resin layer may be formed. Also, a lower surface of the base sheet 31, i.e. a surface of the surface light emitting module 20, may be coated with a resin paste including curable resin and a solvent, and thus a second non-cured resin layer may be formed.

Next, the solvent may be dried and removed from the first non-cured resin layer and the second non-cured resin layer.

Next, a first mold having an inversion pattern of the prism pattern 32P may be used to form a pattern on the first non-cured resin layer, and a second mold having an inversion pattern of the rough surface R1 may be used to form a pattern on the second non-cured resin layer.

Next, thermal curing or optical curing may be used to cure the first non-cured resin layer and the second non-cured resin layer and form the light deflection layer 32 and the light diffusion layer 33X.

Through the processes above, the light deflection diffusion sheet 30X may be manufactured by not using a glue or an adhesive, etc.

A method of manufacturing the light deflection diffusion sheet 30X according to the embodiment above may reduce an amount of used glue or adhesive compared to a technology of combining layers by using the glue or the adhesive, thereby reducing an optical loss of the LCD device 1 and enhancing a brightness and a viewing angle of the LCD 1. Also, a low cost and a brief manufacturing process of the LCD device 1 may be promoted.

Figure 3B:
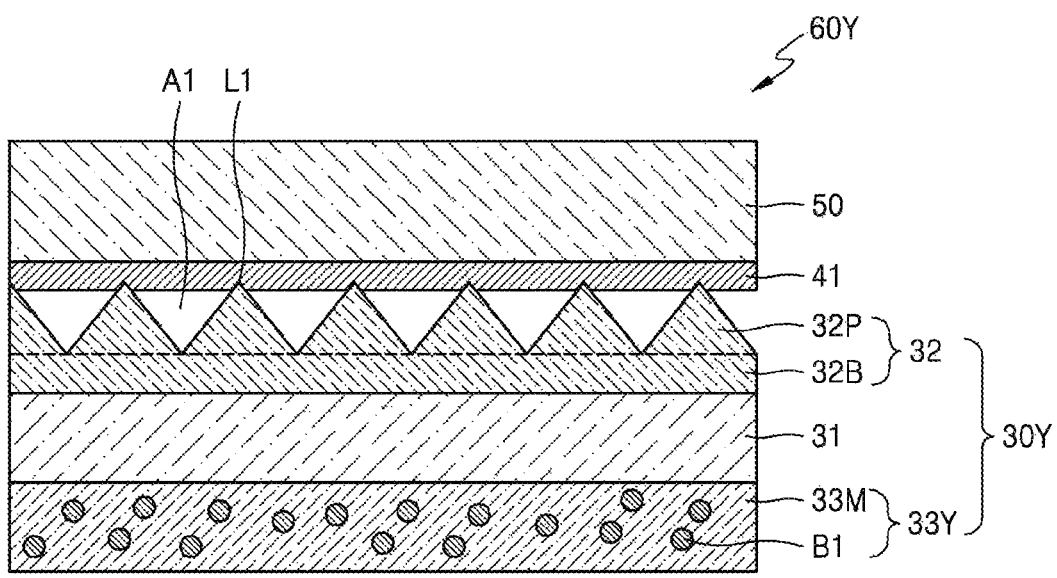
FIG. 3B is a cross-sectional view of a stacked optical sheet including a light deflection diffusion sheet (a cross-sectional view of III-III' of FIG. 2) according to an embodiment, in an LCD device according to an embodiment.

FIG. 3B is a cross-sectional view of a stacked optical sheet 60Y including a light deflection diffusion sheet 30Y (a cross-sectional view of III-III' of FIG. 2) according to an embodiment, in the LCD device 1 according to an embodiment. The stacked optical sheet 60Y is an embodiment of the stacked optical sheet 60 of FIG. 1. The stacked optical sheet 60Y may be arranged between the liquid crystal panel 10 and the surface light emitting module 20 of FIG. 1.

Referring to FIG. 3B, the light deflection diffusion sheet 30Y may include the base sheet 31, a light diffusion layer 33Y disposed on a lower surface of the base sheet 31, and the light deflection sheet 32 disposed on an upper surface of the base sheet 31.

The base sheet 31 and the light deflection layer 32 may be the same as the base sheet 31 and the light deflection layer 32 of FIG. 3A described above, and thus descriptions thereof are omitted.

The light diffusion layer 33Y may be disposed on a lower surface of the base sheet 31, i.e. a surface of the surface light emitting module 20 of the base sheet 31. The light diffusion layer 33Y may include a transmittance resin layer 33M and a plurality of light scatter beads B1 formed in the transmittance resin layer 33M.

Light emitted from the light source 21 of the surface light emitting module 20 and then passing through the light guide plate 22 and incident into the light diffusion layer 33Y may be diffused and scattered by the light scatter beads B1. The light diffusion layer 33Y may diffuse and scatter the light and supply the light to the light deflection layer 32.

The light scatter beads B1 may be formed of acryl resin or styrene resin, etc.

The light diffusion layer 33Y may have a thickness from about 20 μm to about 50 μm but is not limited thereto.

Each of the light scatter beads B1 may have a diameter from about 0.1 μm to about 50 μm but is not limited thereto. The light scatter beads B1 may have a uniform diameter and may have various diameters. Also, diameters and a distribution density of the light scatter beads B1 may be adjusted according to a haze value that is to be implemented To suit a brightness and a viewing angle of the LCD device 1, a haze value of the light diffusion layer 33Y may range from about 5% to about 70%, preferably from about 5% to about 30%, and in particular from about 5% to about 20%.

The light diffusion layer 33Y may be manufactured through the following process:

Firstly, the base sheet 31 may be prepared, and an upper surface of the base sheet 31, i.e. a surface of the liquid crystal panel 10, may be coated with a resin paste including curable resin and a solvent, and thus a first non-cured resin layer may be formed. Also, a lower surface of the base sheet 31, i.e. a surface of the surface light emitting module 20, may be coated with a resin paste including the light scatter beads B1 and a solvent, and thus a second non-cured resin layer may be formed.

Next, the solvent may be dried and removed from the first non-cured resin layer and the second non-cured resin layer.

Next, a mold having an inversion pattern of the prism pattern 32P may be used to form a pattern on the first non-cured resin layer.

Next, thermal curing or optical curing may be used to cure the first non-cured resin layer and the second non-cured resin layer and form the light deflection layer 32 and the light diffusion layer 33Y.

Through the processes above, the light deflection diffusion sheet 30Y may be manufactured by not using a glue or an adhesive, etc.

A method of manufacturing the light deflection diffusion sheet 30X according to the embodiment above may reduce an amount of used glue or adhesive compared to a technology of combining layers by using the glue or the adhesive, thereby reducing an optical loss of the LCD device 1 and enhancing a brightness and a viewing angle of the LCD 1. Also, a low cost and a brief manufacturing process of the LCD device 1 may be promoted.

Figure 4:
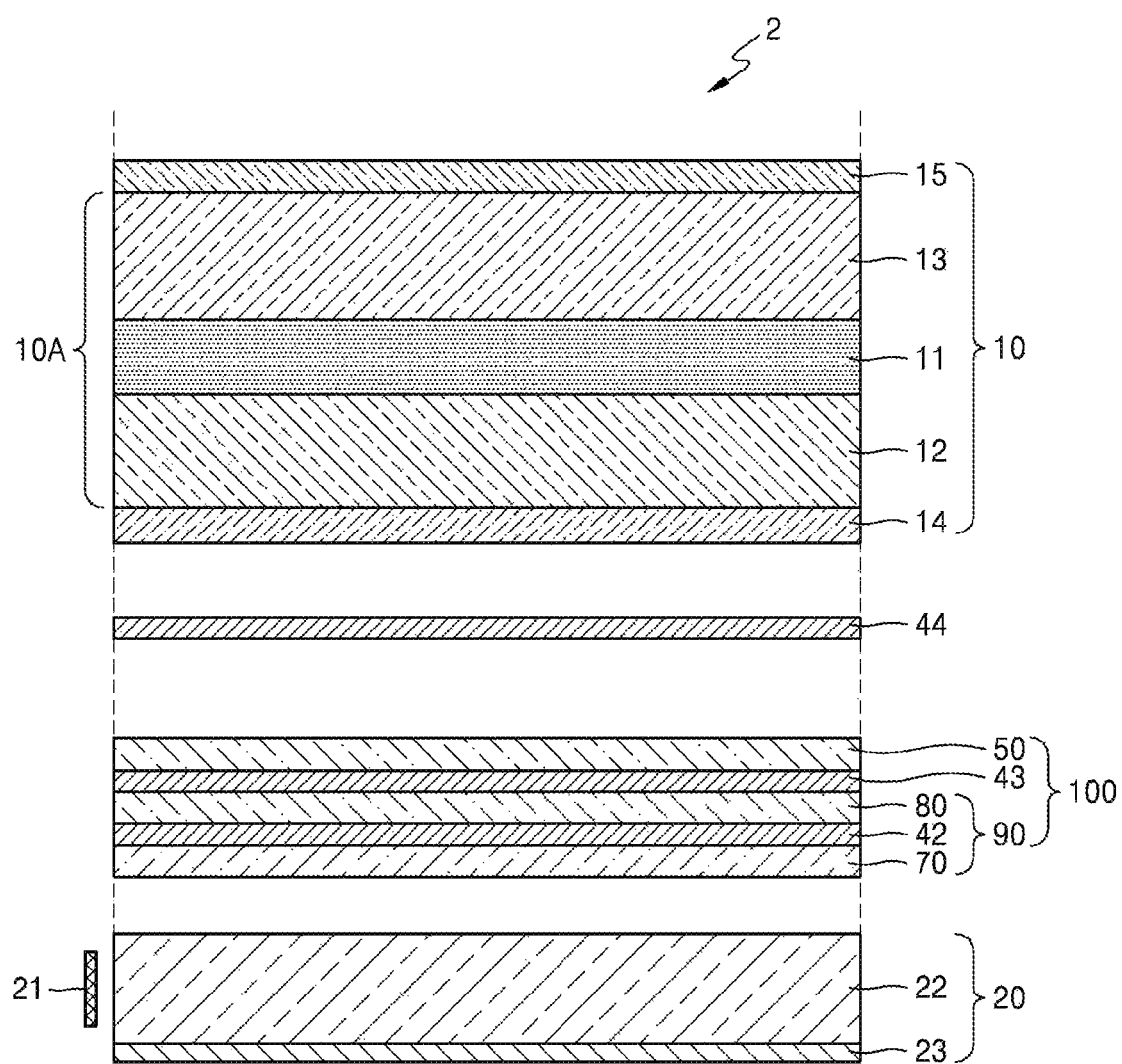
FIG. 4 is an exploded cross-sectional view of an LCD device according to another embodiment.

FIG. 4 is an exploded cross-sectional view of an LCD device 2 according to another embodiment.

Referring to FIG. 4, the LCD device 2 includes the liquid crystal panel 10, the surface light emitting module 20 functioning as a backlight, and a stacked optical sheet 100.

The liquid crystal panel 10 and the surface light emitting module 20 are the same as the liquid crystal panel 10 and the surface light emitting module 20 of FIG. 1 described above, and thus descriptions thereof are omitted.

The stacked optical sheet 100 may be arranged between the liquid crystal panel 10 and the surface light emitting module 20. The stacked optical sheet 100 may include a stacked light deflection diffusion sheet 90, the reflection deflection sheet 50 arranged on the stacked light deflection diffusion sheet 90, and a bonding layer 43 combining the stacked light deflection diffusion sheet 90 and the reflection deflection sheet 50.

The stacked light deflection diffusion sheet 90 may be an optical sheet having a light deflection function and a light diffusion function.

The reflection deflection sheet 50 may selectively reflect a deflection light to be absorbed to the absorption deflection sheet 14 disposed on the lower portion of the liquid crystal panel 10. That is, the reflection deflection sheet 50 may reflect the deflection light absorbed to the absorption deflection sheet 14 to the surface light emitting module 20 in advance. The light reflected to the surface light emitting module 20 by the reflection deflection sheet 50 may repeatedly totally reflected within the light guide plate 22 again. During a total reflection, the light may be partially converted into a deflection light that transmits the absorption deflection sheet 14. Thus, an amount of the deflection light absorbed to the absorption deflection sheet 14 may be reduced, and thus brightness of the LCD device 1 may be enhanced. The reflection deflection sheet 50 may be omitted.

The stacked light deflection diffusion sheet 90 and the reflection deflection sheet 50 may be combined through the bonding layer 43 including a glue or an adhesive, etc. and integrated into the stacked optical sheet 100. The integrated stacked optical sheet 100 may inhibit a sheet from being bent and may enhance handling of the sheet, thereby facilitating assembling of the LCD device 1.

Figure 5A:
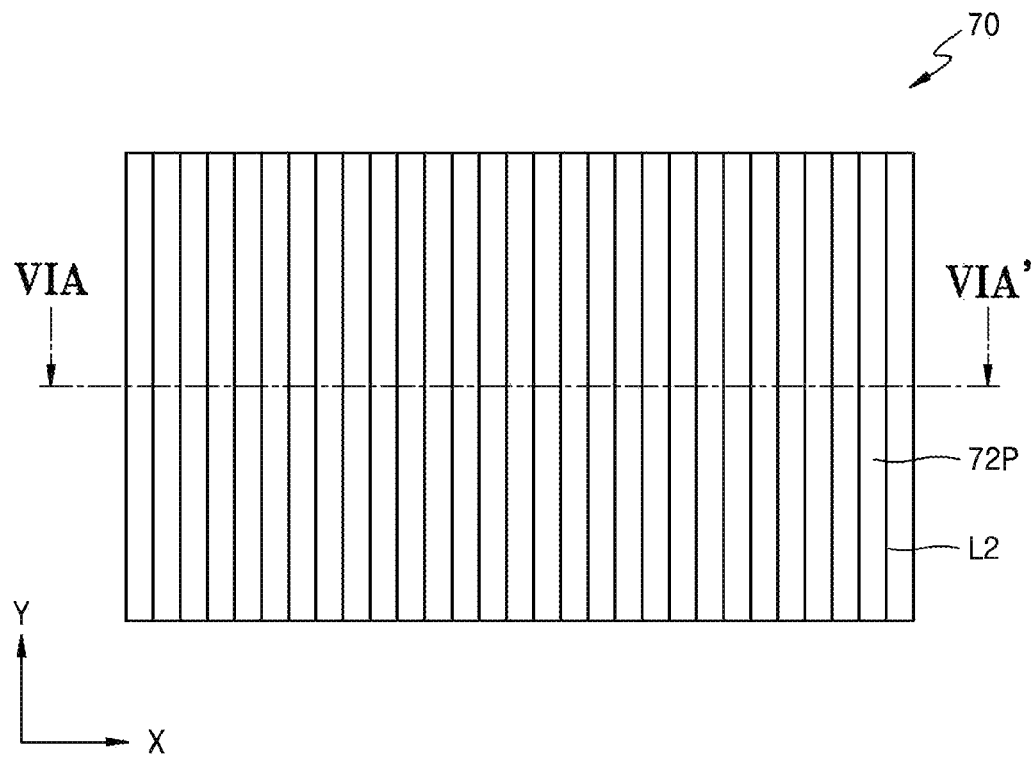
FIG. 5A is a plan view of a light deflection diffusion sheet of an LCD device according to another embodiment.
Figure 5B:
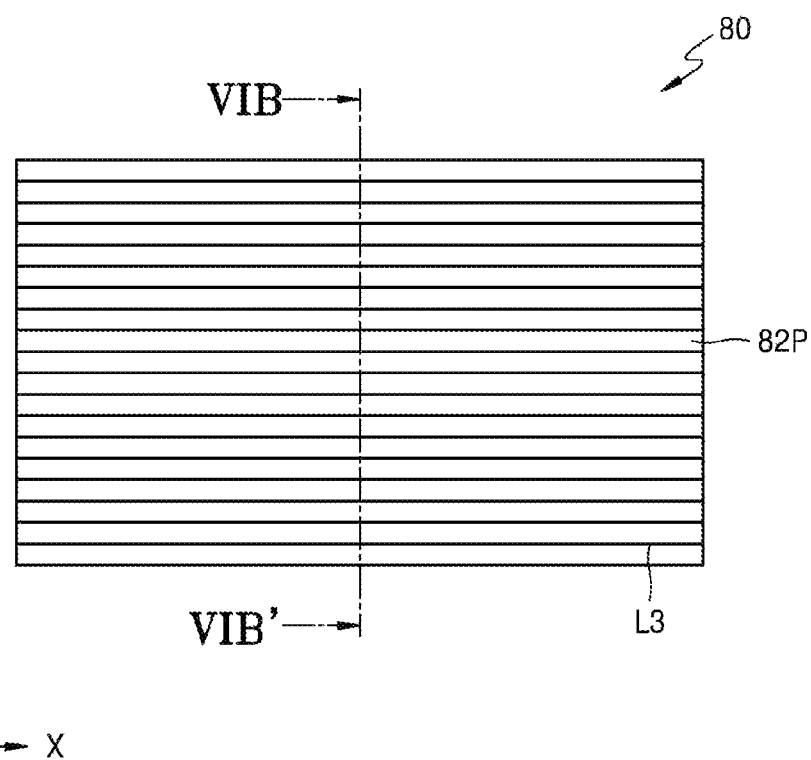
FIG. 5B is a plan view of a light deflection sheet of an LCD device according to another embodiment.

FIG. 5A is a plan view of a light deflection diffusion sheet 70 of a LCD device 2 according to another embodiment. FIG. 5B is a plan view of a light deflection sheet 80 of the LCD device 2 according to another embodiment.

Referring to FIG. 5A, the light deflection diffusion sheet 70 may include a first prism pattern 72P controlling a travel direction of an emission light to a surface of the liquid crystal panel 10 of the light deflection diffusion sheet 70. The first prism pattern 72P may have a ridge L2 in parallel to a width direction of the LCD device 2. The width direction of the LCD device 2 means a Y axis direction.

Referring to FIG. 5B, the light deflection sheet 80 may include a second prism pattern 82P controlling a travel direction of an emission light to a surface of the liquid crystal panel 10 of the light deflection sheet 80. The second prism pattern 82P may have a ridge L3 in parallel to a length direction of the LCD device 2. The length direction of the LCD device 2 means an X axis direction.

The ridge L2 of the first prism pattern 72P of the light deflection diffusion sheet 70 and the ridge L3 of the second prism pattern 82P of the light deflection sheet 80 may be orthogonal to each other, and thus a light deflection of the light deflection diffusion sheet 70 and the light deflection sheet 80 may effectively operate and increase brightness. Also, viewing angles of a screen of the LCD device 2 in horizontal and vertical directions may be adjusted to suitable angles.

In general, the LCD device 2 like a liquid crystal TV has a characteristic that a viewing angle of a horizontal direction is more important than a viewing angle of a vertical direction. Between the light deflection diffusion sheet 70 and the light deflection sheet 80, the ridge L3 of the second prism pattern 82P of the light deflection sheet 80 arranged in the liquid crystal panel 10 may be set as the length direction of the LCD device 2, and thus the viewing angle of the horizontal direction may be effectively increased. Directions of the ridges L2 and L3 of the first and second prism patterns 72P and 82P of the light deflection diffusion sheet 70 and the light deflection sheet 80 are not limited thereto and may be appropriately changed.

Figure 6A:
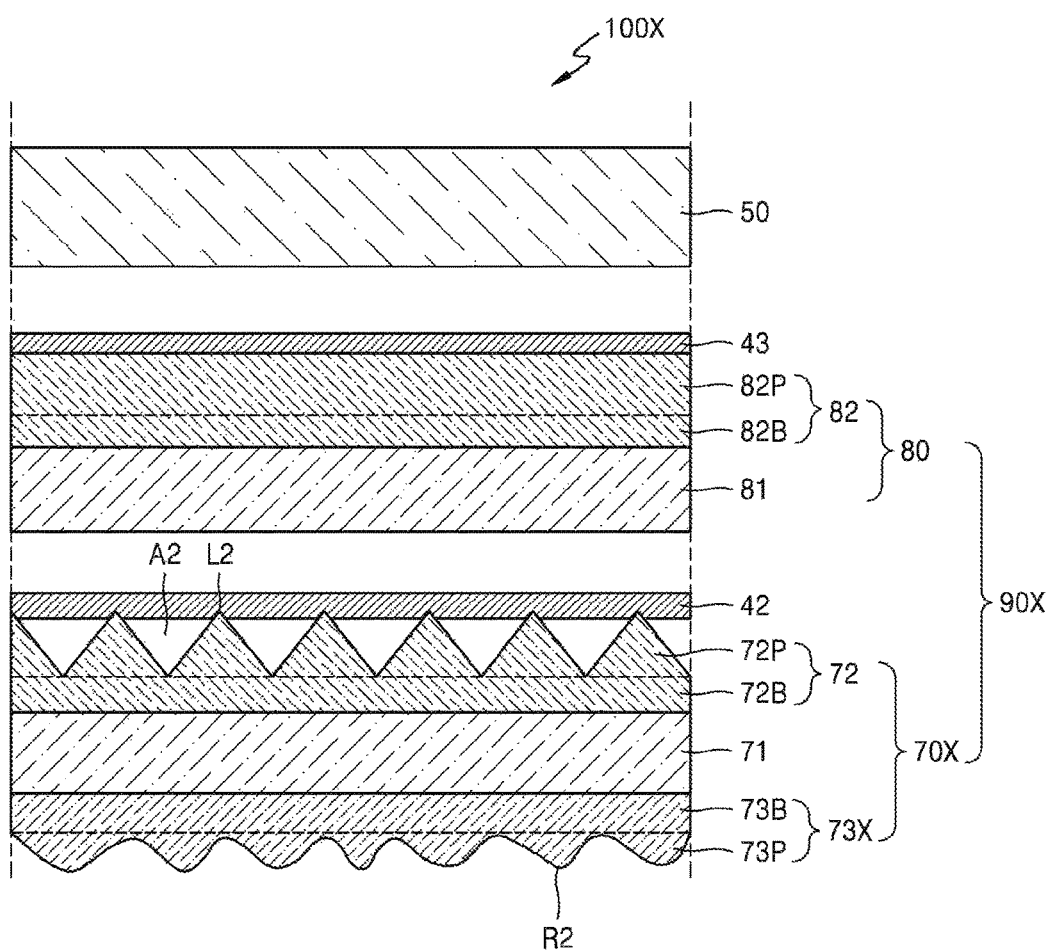
FIG. 6A is a cross-sectional view of a stacked optical sheet including a stacked light deflection diffusion sheet (a cross-sectional view of VIA-VIA' of FIG. 5A) according to an embodiment, in an LCD device according to another embodiment.
Figure 6B:
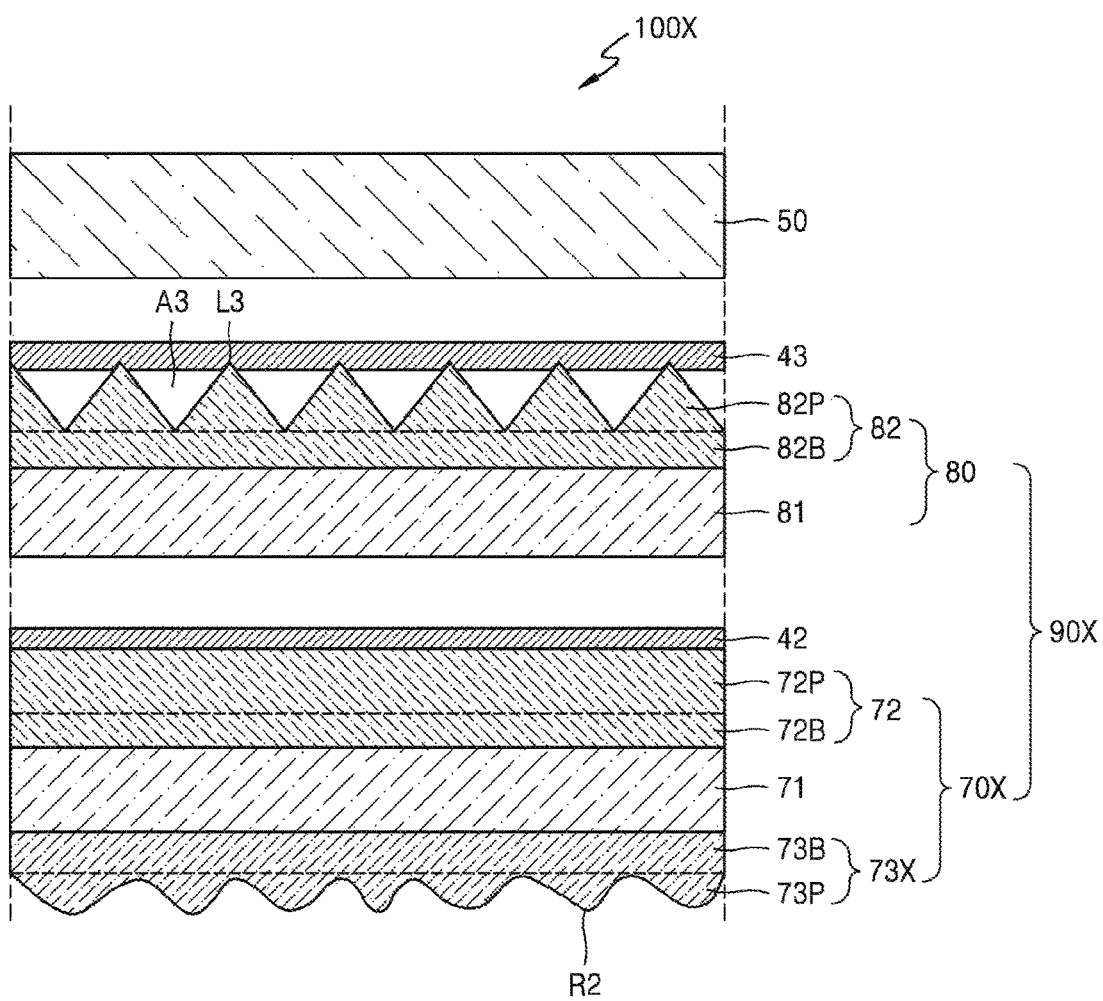
FIG. 6B is a cross-sectional view of a stacked optical sheet including a stacked light deflection diffusion sheet (a cross-sectional view of VIB-VIB' of FIG. 5B) according to another embodiment, in an LCD device according to another embodiment.

FIG. 6A is a cross-sectional view of a stacked optical sheet 100X including a stacked light deflection diffusion sheet 90X (a cross-sectional view of VIA-VIA' of FIG. 5A) according to an embodiment, in the LCD device 2 according to another embodiment. FIG. 6B is a cross-sectional view of the stacked optical sheet 100X including the stacked light deflection diffusion sheet 90X (a cross-sectional view of VIB-VIB' of FIG. 5B) according to another embodiment, in the LCD device 2 according to another embodiment. The stacked light deflection diffusion sheet 100X is an embodiment of the stacked optical sheet 100 of FIG. 4. The stacked light deflection diffusion sheet 100X may be arranged between the liquid crystal panel 10 and the surface light emitting module 20 of FIG. 4.

Referring to FIG. 6A, the stacked light deflection diffusion sheet 100X may include the stacked light deflection diffusion sheet 90X, the reflection deflection sheet 50, and the bonding layer 43 combining the stacked light deflection diffusion sheet 90X and the reflection deflection sheet 50.

The stacked light deflection diffusion sheet 90X may include a light deflection diffusion sheet 70X, the light deflection sheet 80, and the bonding layer 42 combining the light deflection diffusion sheet 80 and the light deflection diffusion sheet 70X.

The light deflection diffusion sheet 70X may include a first base sheet 71, a light diffusion layer 73X disposed on a lower surface of the first base sheet 71, and a first light deflection layer 72 disposed on an upper surface of the first base sheet 71.

The first base sheet 71 may include a material such as PET (polyethyleneterephthalate) or polyester and may transmit incident light. The first base sheet 71 may have a thickness from about 50 μm to about 300 μm but is not limited thereto.

The light diffusion layer 73X may be disposed on a lower surface of the first base sheet 71, i.e. a surface of the surface light emitting module 20 of the first base sheet 71. The light diffusion layer 73X may include a flat base portion 73B and a light diffusion portion 73P formed below the base portion 73B and having a rough surface R2 that functions to diffuse light.

The light diffusion portion 73P may have a thickness from about 20 μm to about 50 μm but is not limited thereto.

The base portion 73B may have a thickness from about 5 μm to about 10 μm but is not limited thereto.

Light emitted from the light source 21 of the surface light emitting module 20 and then passing through the light guide plate 22 and incident into the light diffusion layer 73X may be diffused and scattered by the rough surface R2 of the light diffusion layer 73X. The light diffusion layer 73X may diffuse and scatter the light and supply the light to the first light deflection layer 72.

The first light deflection layer 72 may be disposed on an upper surface of the first base sheet 71, i.e. a surface of the liquid crystal panel 10 of the first base sheet 71. The first light deflection layer 72 may include a flat base portion 72B and a prism pattern 72P formed above the base portion 72B and controlling a travel direction of the light.

The first prism pattern 72P may have a thickness from about 20 μm to about 50 μm but is not limited thereto. Also, an apex angle of the first prism pattern 72P may have a range of 90° and ±5° but is not limited thereto.

The base portion 72B may have a thickness from about 5 μm to about 10 μm but is not limited thereto.

The light diffusion layer 73X and the first light deflection layer 72 may include transmittance resin such as acrylic resin, etc.

The bonding layer 42 connecting the ridges L2 may be formed on the plurality of first prism patterns 72P of the first light deflection layer 72. Between the two adjacent prism patterns 72P, an air portion A2 surrounded by the two adjacent prism patterns 72P and the bonding layer 42 may be formed. The bonding layer 42 may not be formed in the air portion A2. Accordingly, light emitted from each surface of the first prism pattern 72P may not be diffracted by the bonding layer 42 and a travel direction of the light may be controlled.

Also, the bonding layer 42 may combine and integrate the light deflection diffusion sheet 70X and the reflection deflection sheet 80 into the stacked light deflection diffusion 90X.

In the use of a liquid crystal TV, etc., brightness of the LCD device 2 may be more than 2900 cd/m$^2$ and preferably more than 3000 cd/m$^2$.

In the use of the liquid crystal TV, etc., both a horizontal viewing angle and a vertical viewing angle of the LCD device 2 may be more than 52° and preferably more than 55°.

The horizontal viewing angle and the vertical viewing angle may be angles having a center brightness of ½.

To suit the brightness and the viewing angle of the LCD device 2, a haze value of the light diffusion portion 73P of the light diffusion layer 73X may range from about 5% to about 70%, preferably from about 5% to about 30%, and in particular from about 5% to about 20%.

The method of manufacturing the light deflection diffusion sheet 70X may be the same as the method of manufacturing the light deflection diffusion sheet 30X described above.

Referring to FIG. 6B, the light deflection sheet 80 may be arranged in a direction of the liquid crystal panel 10 of the light deflection diffusion sheet 70X. The light deflection sheet 80 may include a second base sheet 81 and a second light deflection layer 82 disposed on an upper surface of the second base sheet 81.

The second base sheet 81 may include a material such as PET (polyethyleneterephthalate) or polyester and may transmit incident light. The second base sheet 81 may have a thickness from about 50 μm to about 300 μm but is not limited thereto.

The second light deflection layer 82 may be disposed on an upper surface of the second base sheet 81, i.e., a surface of the liquid crystal panel 10 of the second base sheet 81. The second light deflection layer 82 may include a flat base portion 82B and a second prism pattern 82P formed above the base portion 82B and controlling a travel direction of light.

The second prism pattern 82P may have a thickness from about 20 μm to about 50 μm but is not limited thereto. Also, an apex angle of the second prism pattern 82P may have a range of 90° and ±5° but is not limited thereto. The base portion 82B may have a thickness from about 5 μm to about 10 μm but is not limited thereto.

The second light deflection layer 82 may include transmittance resin such as acrylic resin, etc.

The bonding layer 43 connecting the ridges L3 may be formed on the plurality of second prism patterns 82P of the second light deflection layer 82. Between the two adjacent prism patterns 82P, an air portion A3 surrounded by the two adjacent prism patterns 82P and the bonding layer 43 may be formed. The bonding layer 43 may not be formed in the air portion A3. Accordingly, light emitted from each surface of the second prism pattern 82P may not be diffracted by the bonding layer 43 and a travel direction of the light may be controlled.

Also, the bonding layer 43 may combine and integrate the stacked light deflection diffusion sheet 90X and the reflection deflection sheet 50 into the stacked light deflection diffusion sheet 100X.

Figure 7:
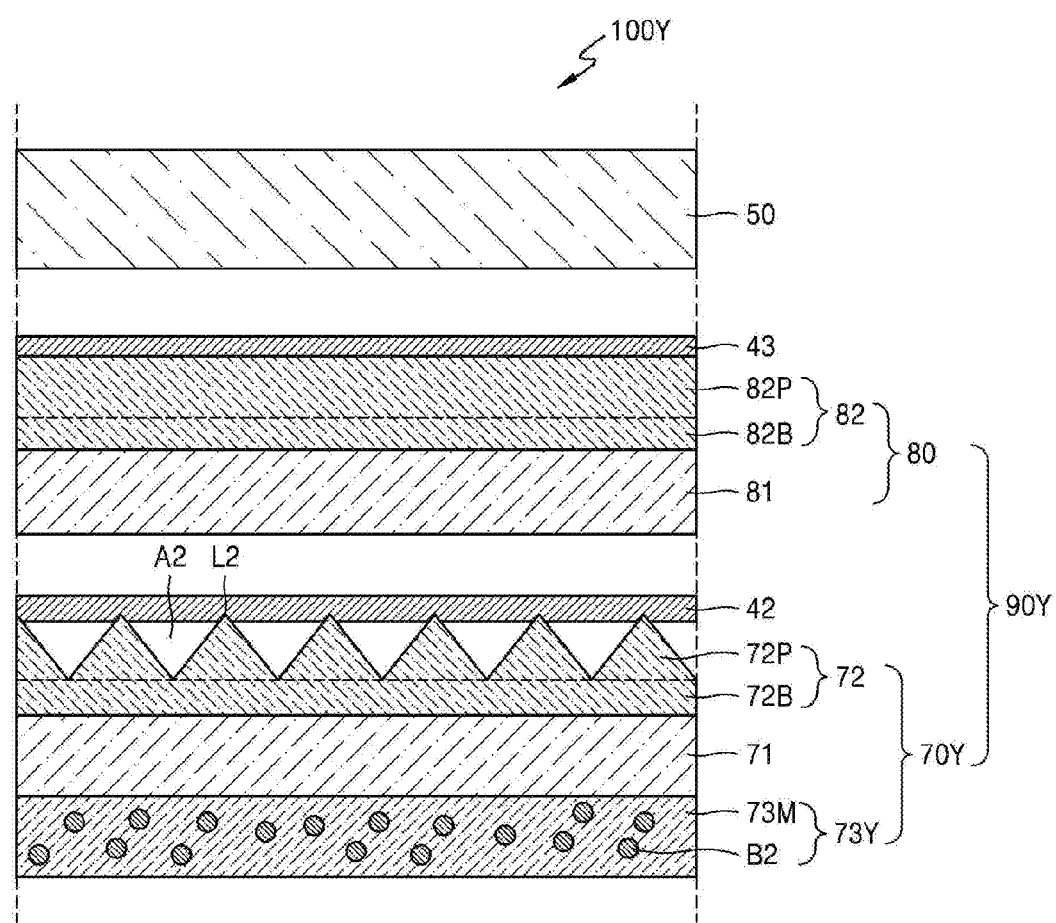
FIG. 7 is a cross-sectional view of a stacked optical sheet including a stacked light deflection diffusion sheet (a cross-sectional view of VIA-VIA' of FIG. 5A) according to another embodiment, in an LCD device according to another embodiment.

Referring to FIG. 7, a stacked light deflection diffusion sheet 100Y may include a stacked light deflection diffusion sheet 90X, the reflection deflection sheet 50, and the bonding layer 43 combining the stacked light deflection diffusion sheet 90Y and the reflection deflection sheet 50. The reflection deflection sheet 50 and the bonding layer 43 are the same as the reflection deflection sheet 50 and the bonding layer 43 of FIGS. 6A and 6B described above, and thus descriptions thereof are omitted.

The stacked light deflection diffusion sheet 90Y may include a light deflection diffusion sheet 70Y, the light deflection sheet 80, and the bonding layer 42 combining the light deflection diffusion sheet 70Y and the light deflection diffusion sheet 80. The light deflection sheet 80 and the bonding layer 42 are the same as the light deflection sheet 80 and the bonding layer 42 of FIGS. 6A and 6B described above, and thus descriptions thereof are omitted.

The light deflection diffusion sheet 70Y may include the first base sheet 71, a light diffusion layer 73Y disposed on a lower surface of the first base sheet 71, and the first light deflection layer 72 disposed on an upper surface of the first base sheet 71. The first base sheet 71 and the first light deflection layer 72 are the same as the first base sheet 71 and the first light deflection layer 72 of FIGS. 6A and 6B described above, and thus descriptions thereof are omitted.

The light diffusion layer 73Y may be disposed on a lower surface of the first base sheet 71, i.e., a surface of the surface light emitting module 20 of the first base sheet 71. The light diffusion layer 73Y may include a transmittance resin layer 73M and a plurality of light scatter beads B2 formed in the transmittance resin layer 73M.

Light emitted from the light source 21 of the surface light emitting module 20 and then passing through the light guide plate 22 and incident into the light diffusion layer 73Y may be diffused and scattered by the light scatter beads B2 of the light diffusion layer 73Y. The light diffusion layer 73Y may diffuse and scatter the light and supply the light to the first light deflection layer 72.

The light scatter beads B2 may be formed of acryl resin or styrene resin, etc.

The light diffusion layer 73Y may have a thickness from about 20 μm to about 50 μm but is not limited thereto.

Each of the light scatter beads B2 may have a diameter from about 0.1 μm to about 50 μm but is not limited thereto. The light scatter beads B2 may have a uniform diameter and may have various diameters. Also, diameters and a distribution density of the light scatter beads B2 may be adjusted according to a haze value that is to be implemented To suit a brightness and a viewing angle of the LCD device 2, a haze value of the light diffusion layer 73Y may range from about 5% to about 70%, preferably from about 5% to about 30%, and in particular from about 5% to about 20%.

A method of manufacturing the light deflection diffusion sheet 70Y may be the same as the method of manufacturing the light deflection diffusion sheet 30Y described above.

The stacked optical sheets 100X and 100Y according to the embodiments above may reduce an amount of used glue or adhesive compared to a technology of combining layers by using a glue or an adhesive, thereby reducing an optical loss of the LCD device 2 and enhancing a brightness and a viewing angle of the LCD device 2. Also, a low cost and a brief manufacturing process of the LCD device 2 may be promoted.

Figure 8:
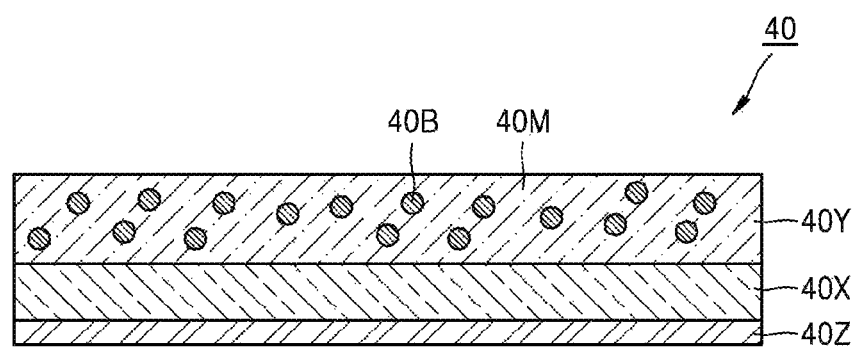
FIG. 8 is a cross-sectional view of a bonding layer according to an embodiment.

FIG. 8 is a cross-sectional view of a bonding layer 40 according to an embodiment. The bonding layers 41, 42, and 43 described above may be the bonding layer 40 of FIG. 8.

Referring to FIG. 8, the bonding layer 40 may include a base layer 40X, an adhesion layer 40Z disposed on one surface of the base layer 40X, and a light diffusion type adhesion portion 40Y disposed on another surface of the base layer 40X. One surface of the base layer 40X may be a surface of the surface light emitting module 20 of the base layer 40C, and another surface thereof may be a surface of the liquid crystal panel 10 of the base layer 40X.

The base layer 40X may be formed of transmittance resin such as PET (polyethyleneterephthalate), etc.

A prism pattern may be bonded to the adhesion layer 40Z. If a concave part of the prism pattern is filled by an adhesive, etc., since a refraction effect of light disappears by the prism pattern, a deterioration of brightness may occur. To prevent this, a thickness of the adhesion layer 40Z may be several micrometers, and only a part of the prism pattern may be bonded to the adhesion layer 40Z. Thus, the concave part of the prism pattern, i.e., an air portion may not be filled by the adhesion layer 40Z.

The adhesion layer 40Z may include at least one of an acrylic based adhesive, a silicone based adhesive, a urethane based adhesive, an epoxy based adhesive, a cellulosic based adhesive, and a rubber based adhesive.

Each of light scatter beads 40B may have a diameter from about 1 μm to about 4 μm. The light scatter beads 40B may have a uniform diameter and may have various diameters. The light scatter beads 40B may include an inorganic material such as silica, alumina, titanium dioxide ($TIO_2$), zirconium oxide ($ZrO_2$), tin oxide, indium oxide, cadmium oxide, antimony oxide, etc. Also, the light scatter beads 40B may include a polymer material such as silicon based resin, acryl based resin, styrene based resin, urethane based resin, melamine based resin, etc. The light scatter beads 40B may include a plurality of materials.

Each of the light scatter beads 40B may have a refractive index from about 1.30 to about 1.70. A difference between the light scatter beads 40B and a transmittance adhesion layer 40M may range from about 0.01 to about 0.13.

A content of the light scatter beads 40B in the light diffusion type adhesion portion 40Y may range from about 0.3 wt % to about 50 wt %.

Light incident into a surface of the surface light emitting module 20 of the bonding layer 40, i.e. the adhesion layer 40Z, may pass through the base layer 40Y and may be incident into the light diffusion type adhesion portion 40Y. The light incident into the light diffusion type adhesion portion 40Y may be diffused and scattered by the light scatter beads 40B and may be emitted to a surface of the liquid crystal panel 10 of the bonding layer 40.

The bonding layer 40 may bond adjacent sheets to each other and diffuse the incident light, and thus the sheets may be inhibited from being bent and handling of the sheets may be enhanced, thereby facilitating assembling of an LCD device and simultaneously enhancing an optical characteristic such as brightness and a viewing angle, etc.

The embodiments are examples, and thus, it will be understood by those of ordinary skill in the art that various changes in form and details may be made therein without departing from the spirit and scope of the invention. Therefore, the embodiments should be considered in descriptive sense only and not for purposes of limitation. For example, each constituent element that is described as a singular form may be embodied in distribution forms. Also, constituent elements that are described in distribution forms may be embodied in a combined form.

While one or more embodiments have been described with reference to the figures, it will be understood by those of ordinary skill in the art that various changes in form and details may be made therein without departing from the spirit and scope as defined by the following claims.

The invention claimed is:

1. A liquid crystal display (LCD) device comprising:
a liquid crystal panel having a length direction and a width direction;
a surface light emitting module;
a base sheet disposed between the liquid crystal panel and the surface light emitting module;
a light diffusion layer disposed on a surface of the base sheet facing the surface light emitting module and diffusing light incident from the surface light emitting module;
a light deflection layer disposed on a surface of the base sheet facing the liquid crystal panel and controlling a travel direction of the light;
a reflection deflection sheet disposed between the liquid crystal panel and the light deflection layer;
an adhesion layer bonded to the light deflection layer; and
a light diffusion type adhesion layer bonded to the reflection deflection sheet and comprising a plurality of light scatter beads.

2. The LCD device of claim 1, wherein the surface light emitting module comprises at least one of an edge type surface light emitting module or a direct type surface light emitting module.

3. The LCD device of claim 1, wherein the light deflection layer comprises a prism pattern having a ridge in parallel to the length direction of the liquid crystal panel.

4. The LCD device of claim 1, wherein the light diffusion layer comprises a rough surface that diffuses and scatters the light.

5. The LCD device of claim 1, wherein the light diffusion layer comprises a plurality of light scatter beads that diffuse and scatter the light.

6. The LCD device of claim 1, wherein the reflection deflection sheet is configured to reflect deflected light of the light to the surface light emitting module.

7. The LCD device of claim 6, further comprising: a bonding layer configured to combine the light deflection layer and the reflection deflection sheet.

8. A liquid crystal display (LCD) device comprising:
a liquid crystal panel having a length direction and a width direction;
a surface light emitting module;
a first base sheet disposed between the liquid crystal panel and the surface light emitting module;
a light diffusion layer disposed on a surface of the first base sheet facing the surface light emitting module and diffusing light incident from the surface light emitting module;
a first light deflection layer disposed on a surface of the first base sheet facing the liquid crystal panel and controlling a travel direction of the light;
a second base sheet disposed between the liquid crystal panel and the first light deflection layer;
a second light deflection layer disposed on a surface of the second base sheet facing the liquid crystal panel;

a reflection deflection sheet disposed between the liquid crystal panel and the second light deflection layer; and a bonding layer disposed between the second light deflection layer and the reflection deflection sheet, and comprising a plurality of light scatter beads.

9. The LCD device of claim 8, wherein the surface light emitting module comprises at least one of an edge type surface light emitting module or a direct type surface light emitting module.

10. The LCD device of claim 8, wherein the first light deflection layer comprises a first prism pattern having a ridge in parallel to the width direction of the liquid crystal panel, and wherein the second light deflection layer comprises a second prism pattern having a ridge in parallel to the length direction of the liquid crystal panel.

11. The LCD device of claim 8, wherein the light diffusion layer comprises a rough surface that diffuses and scatters the light.

12. The LCD device of claim 8, wherein the light diffusion layer comprises a plurality of light scatter beads that diffuse and scatter the light.

13. The LCD device of claim 8, wherein the reflection deflection sheet is configured to reflect deflected light of the light to the surface light emitting module.

14. The LCD device of claim 13, wherein the bonding layer is configured to combine the second light deflection layer and the reflection deflection sheet.

15. The LCD device of claim 14, wherein the bonding layer further comprises:

an adhesion layer bonded to the second light deflection layer; and a light diffusion type bonding portion bonded with the reflection deflection sheet and comprising the plurality of light scatter beads.

16. A light deflection diffusion sheet disposed between a liquid crystal panel having a length direction and a width direction and a surface light emitting module, the light deflection diffusion sheet comprising:

a base sheet;

a light diffusion layer disposed on a surface of the base sheet facing the surface light emitting module and diffusing light incident from the surface light emitting module;

a light deflection layer disposed on a surface of the base sheet facing the liquid crystal panel of the base sheet and controlling a travel direction of the light;

a reflection deflection sheet disposed between the liquid crystal panel and the light deflection layer;

an adhesion layer bonded to the light deflection layer; and a light diffusion type adhesion layer bonded to the reflection deflection sheet and comprising a plurality of light scatter beads.

17. The light deflection diffusion sheet of claim 16, wherein the reflection deflection sheet is configured to reflect deflected light of the light to the surface light emitting module.

18. The light deflection diffusion sheet of claim 16, wherein the light deflection layer comprises a prism pattern having a ridge in parallel to the length direction of the liquid crystal panel.

19. The light deflection diffusion sheet of claim 16, wherein the light diffusion layer comprises a plurality of light scatter beads that diffuse and scatter the light.

* * * * *